UNITED STATES PATENT OFFICE.

WALTER KAEMPFE, OF GROSSENHAIN, GERMANY.

PROCESS FOR THE MANUFACTURE OF POLYMERIZED PRODUCTS FROM ANIMAL OILS.

1,121,925.  Specification of Letters Patent.  Patented Dec. 22, 1914.

No Drawing.  Application filed April 8, 1913. Serial No. 759,795.

*To all whom it may concern:*

Be it known that I, WALTER KAEMPFE, subject of the German Emperor, and residing at Grossenhain, in Saxony, Germany, have invented a certain new and useful Improved Process for the Manufacture of Polymerized Products from Animal Oils, of which the following is a specification.

This invention relates to the production of polymerized products from animal oils.

The object of the invention is to provide an improved process of the type in which an animal oil, for example fish oil, train oil or the like, for the purpose of obtaining polymerized products, is fractionally hydrolyzed and distilled. A known process of this type devised by the present applicant is carried out broadly in the following manner:—The oil is heated in a retort for several hours to 235° to 240° C. and then steam at a temperature of 385° to 400° C. is blown through the retort. During the passage of steam through the retort the glycerids of the saturated fatty acids are hydrolyzed and their components distil off and the glycerids of the unsaturated fatty acids polymerize, but care has to be taken that during this process the temperature is not allowed to rise much above 260° to 285°, for it has been found that above this temperature the unsaturated glycerids are liable to be decomposed. The duration of this latter process varied according to the iodin number of the oil, being between say 20 to 30 hours.

The present invention consists in effecting the fractional hydrolysis by heating the oil to 280° C. and then allowing it to stand without substantial addition or subtraction of heat, prior to distillation. The polymerized products obtained are particularly adapted for use as linseed oil varnish substitutes and they may be had in various degrees of viscosity.

In carrying the invention into effect, between the first heating period in the retort and the second or distillation period with the use of auxiliary superheated steam, the material to be treated is left to rest and during this period of spontaneous action, the separation of the readily hydrolyzable glycerids takes place comparatively very quickly. Moreover, during this time small quantities of fatty acids and traces of glycerin, acrolein and other compounds distil over. Owing to this interpolated period of rest, during which no energy of any kind is supplied, a considerable saving in time is effected. As final products resulting from the subsequent distillation a white distillate and a residue of heavy oil or substitute for varnish are obtained, and the work is much simplified, the working hours required for the distillation being reduced by about 6 hours. The following is a detailed description of this modified process:—The fish oil is placed in the retort and first heated to about 280°. The fire is then removed and the dampers closed for about 1 to 2 hours. During this time the oil heats spontaneously up to about 350°, and, owing to this, small quantities of fatty acids and traces of glycerin, acrolein and other compounds, as well as some water, distil over. The whole of the distillate here referred to amounts to about 5% to 8% of the total mass. During the separation of the easily hydrolyzable glycerids which now occurs, the temperature gradually falls from 350° to about 285°. When this temperature is reached the distillation by means of steam at about 375°, with or without the use of a vacuum, is begun. Although the superheated steam has no hydrolytic effect, this very high temperature is chosen in order to be able to work with the greatest possible saving in time.

One final product of the process is an almost white distillate, despite the period of distillation being possibly reduced by about 6 to 8 hours. Another is a residue of heavy oil or substitute for varnish.

It is obvious that it is possible to carry out the process with a reduction in the temperature of the retort, as well as of the superheated steam. The final product in that case remains the same, only the period is lengthened in accordance with the reduction in temperature. The subsequent boiling and other treatment of the product is carried out as described above.

Having now described my invention, what I claim as new and desire to secure by Letters Patent is:—

1. A process for the production of polymerized products from animal oils comprising heating the oil to about 280° C., allowing the oil to stand without substantial addition or subtraction of heat until the saturated glycerids are hydrolyzed and subsequently subjecting it to distillation.

2. A process for the production of polymerized products from animal oils comprising heating the oil to about 280° C., allowing the oil to stand without substantial addition or subtraction of heat until the saturated glycerids are hydrolyzed and subsequently subjecting it to distillation by means of superheated steam at a temperature of 375° C.

3. A process for the production of polymerized products from animal oils comprising heating the oil to about 280° C., allowing the oil to stand without substantial addition or subtraction of heat until the saturated glycerids are hydrolyzed and subsequently subjecting it to distillation in a vacuum by means of superheated steam at a temperature of 375° C.

In testimony whereof, I affix my signature in the presence of two witnesses.

WALTER KAEMPFE.

Witnesses:
 PAUL ARRAS,
 ARTHUR GUBS.